United States Patent
Nishikawa et al.

(10) Patent No.: US 7,910,507 B2
(45) Date of Patent: Mar. 22, 2011

(54) GLASS CERAMIC MATERIAL FOR PLASMA DISPLAY

(75) Inventors: Kazuhiro Nishikawa, Matsusaka (JP); Koji Tominaga, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 93 days.

(21) Appl. No.: 12/520,374

(22) PCT Filed: Dec. 20, 2007

(86) PCT No.: PCT/JP2007/074505
§ 371 (c)(1), (2), (4) Date: Jun. 19, 2009

(87) PCT Pub. No.: WO2008/081728
PCT Pub. Date: Jul. 10, 2008

(65) Prior Publication Data
US 2010/0093512 A1      Apr. 15, 2010

(30) Foreign Application Priority Data
Dec. 28, 2006  (JP) .................. 2006-354476

(51) Int. Cl.
*C03C 8/22*   (2006.01)
*C03C 4/04*   (2006.01)

(52) U.S. Cl. ................ 501/16; 501/21; 501/24; 501/26; 501/48; 501/49; 501/51; 501/52; 501/77; 501/79

(58) Field of Classification Search ................ 501/16, 501/21, 24, 26, 47, 48, 49, 52, 77, 79
See application file for complete search history.

(56) References Cited

U.S. PATENT DOCUMENTS

| | | | |
|---|---|---|---|
| 6,197,480 B1 | 3/2001 | Iguchi et al. | |
| 6,551,720 B2 * | 4/2003 | Sreeram et al. | 428/469 |
| 6,623,906 B2 * | 9/2003 | Iha | 430/270.1 |

FOREIGN PATENT DOCUMENTS

| | | | |
|---|---|---|---|
| JP | 10-120432 A | | 5/1998 |
| JP | 3402070 B2 | | 2/2003 |
| JP | 2003-257322 A | | 9/2003 |
| JP | 11092168 | * | 9/2003 |
| JP | 2005-174683 A | | 6/2005 |
| JP | 3696725 B2 | | 7/2005 |
| JP | 3716787 B2 | | 9/2005 |
| JP | 2006-151763 A | | 6/2006 |
| JP | 2006-347835 A | | 12/2006 |

OTHER PUBLICATIONS

International Search Report dated Mar. 25, 2008 (Eight (8) pages).

* cited by examiner

*Primary Examiner* — Karl E Group
(74) *Attorney, Agent, or Firm* — Crowell & Moring LLP

(57) ABSTRACT

There is provided a glass ceramic material for plasma display, in which glass fine grains (A) having a softening point of 570-640° C. are in 40-70 wt %, and glass fine grains (B) having a softening point of 480-540° C. are in 30-60 wt %, the glass ceramic material for plasma display being characterized in that the glass fine grains (A) comprise 2-12 wt % of $SiO_2$, 50-58 wt % of $B_2O_3$, 10-20 wt % of $Al_2O_3$, 0-6 wt % of ZnO, 0-2.8 wt % of $Li_2O$, and 10-22 wt % of at least one selected from MgO, CaO, SrO and BaO and that refractive index of the glass fine grains (A) is 1.53-1.56.

6 Claims, No Drawings

GLASS CERAMIC MATERIAL FOR PLASMA DISPLAY

TECHNICAL FIELD

The present invention relates to a glass ceramic material for a photosensitive paste mainly used for forming a partition wall layer of plasma display panel, plasma address liquid-crystal display panel, etc. and for forming a high precision pattern in the insulating film formation of other electric and electronic circuits.

BACKGROUND OF THE INVENTION

Along with the development of electronic parts in recent years, there have been developed many kinds of display panels, such as plasma display panel, liquid-crystal display panel, electroluminescence panel, fluorescence display panel, electrochromic display panel, light-emitting diode display panel, and gas discharge type display panel. Of these, plasma display panel (hereinafter, abbreviated as PDP) attracts attention as a thin, large-size, flat plate type color display device. PDP has many cells between a front surface substrate, which is used as a display surface, and a back surface substrate. An image is formed by conducting plasma discharge in the cells. In this cell, a section is formed by a partition wall of an inorganic material. Electrodes are formed per each pixel in order to control the display condition in each pixel forming an image.

On this PDP's back surface substrate, partition walls for section formation of discharge cells are formed. In recent years, a demand for high precision has increased, and along therewith a demand for forming a partition wall layer with high aspect ratio and high precision has increased.

Furthermore, a high-price, high-strain point glass is used as a glass substrate in the production of PDP, since it is baked at a high temperature of around 600° C. There is, however, a desire from PDP makers to change it to a lower-price soda-lime glass. Thus, there is expected a development of a glass ceramic material for plasma display that can be baked at a low temperature of not higher than 560° C.

Hitherto, in the case of conducting patterning of inorganic material, sand blast method is frequently used. Sand blast method, however, has had a defect of no capability to form a partition wall layer with high aspect ratio and high precision, due to excessive grinding caused by rebound and electrification of grinding material, a phenomenon of so-called side etching.

Thus, there is proposed a manner of increasing grinding resistance by adding organic resin into glass paste (see Patent Publication 1).

Furthermore, there is proposed a method of forming a partition wall layer with high aspect ratio and high precision by photolithography technique using photosensitive glass paste (see Patent Publications 2-4).

Furthermore, there is proposed an example in which glass fine grains having a softening point of 800° C. have been added in about 20 weight % as a manner of widening the optimum baking temperature range (see Patent Publication 4).

Furthermore, in composition, there is proposed a system of using lead oxide and bismuth oxide for the purpose of improving thermal softening temperature and water resistance (see Patent Publications 2 and 4).

Patent Publication 1: Japanese Patent Application Publication 2003-257322
Patent Publication 2: Japanese Patent Publication 3402070
Patent Publication 3: Japanese Patent Publication 3696725
Patent Publication 4: Japanese Patent Publication 3716787

SUMMARY OF THE INVENTION

The above-mentioned information described, for example, in Japanese Patent Application Publication 2003-257322 has had a problem of lowering of cutting efficiency, although surely grinding resistance is enhanced by adding organic resin.

Furthermore, no inorganic material other than glass fine grains is used in photosensitive pastes shown in Japanese Patent Publication 3402070, Japanese Patent Publication 3696725, and Japanese Patent Publication 3716787. Therefore, when baking temperature becomes a little higher than desired temperature during baking step after pattern formation, there occurs a defect that glass fine grains soften and flow so that a partition wall layer cannot be formed with high precision.

Furthermore, in an example that is shown in Japanese Patent Publication 3716787 and that glass fine grains having a softening point of 800° C. have been added in about 20 wt %, it is necessary to have a high temperature of 1500° C. in order to produce a glass having a softening point that exceeds 700° C. Therefore, it is not efficient.

Furthermore, in view of composition, lead oxide and bismuth oxide, which are used in Japanese Patent Publication 3716787 and Japanese Patent Publication 3402070, have a considerable harmful influence on human body and environment. Therefore, there is a tendency in recent years to avoid their use.

Thus, it is not possible to say that there has been obtained one that solves various problems, as a glass ceramic material for photosensitive paste that is used for forming a partition wall layer of plasma display panel, plasma address liquid-crystal display panel, etc. and for forming a high precision pattern in the insulating film formation of other electric and electronic circuits.

According to the present invention, there is provided a glass ceramic material for plasma display, in which glass fine grains (A) having a softening point of 570-640° C. are in 40-70 wt %, and glass fine grains (B) having a softening point of 480-540° C. are in 30-60 wt %, the glass ceramic material for plasma display being characterized in that the glass fine grains (A) comprise 2-12 wt % of $SiO_2$, 50-58 wt % of $B_2O_3$, 10-20 wt % of $Al_2O_3$, 0-6 wt % of ZnO, 0-2.8 wt % of $Li_2O$, and 10-22 wt % of at least one selected from MgO, CaO, SrO and BaO and that refractive index is 1.53-1.56.

According to the present invention, there is provided a back surface substrate for PDP, which is characterized in that the above glass ceramic material for plasma display is used.

DETAILED DESCRIPTION

According to the present invention, it is possible to provide a glass ceramic material for photosensitive paste, which is capable of forming a high precision pattern in terms of the formation a partition wall layer of plasma display panel, plasma address liquid-crystal display panel, etc., in which mainly soda-lime glass substrate is used, and the insulating film formation of other electric and electronic circuits.

In the present invention, we have found out that a baking of 500-560° C. is possible, and it can preferably be used for a plasma display panel using soda-lime glass substrate, by a construction that the glass fine grains (A) having a softening point of 570-640° C. are in 40-70 wt %, and the glass fine grains (B) having a softening point of 480-540° C. are in 30-60 wt % on condition that the total weight of the glass fine grains (A) and the glass fine grains (B) is 100 wt %.

If the glass fine grains (A) are less than 40 wt %, the sintered body tends to soften and flow. On the other hand, if it exceeds 70 wt %, it is not possible to obtain a compact sintered body, and the baking is not possible in a range of 500-560° C. Similarly, if the glass fine grains (B) are less than 30 wt %, it is not possible to obtain a compact sintered body. If it exceeds 60 wt %, the sintered body tends to soften and flow, and the baking is not possible in a range of 500-560° C.

The glass fine grains (A) used in the present invention are of a lead-free, bismuth-free, low-melting-point glass characterized in that it contains 2-12 wt % of $SiO_2$, 50-58 wt % of $B_2O_3$, 10-20 wt % of $Al_2O_3$, 0-6 wt % of ZnO, 0-2.8 wt % of $Li_2O$, and 10-22 wt % of at least one selected from MgO, CaO, SrO and BaO and that refractive index is 1.53-1.56. In the following, each constituent component of this glass is described in detail.

$SiO_2$ is a glass forming component. By making it coexist with $B_2O_3$, which is another glass forming component, it is possible to form a stable glass. It is contained in 2-12% (wt %, it is the same in the following, too). If it is less than 2%, glass formation becomes difficult. On the other hand, if it exceeds 12%, flow property of glass lowers, and it becomes difficult to obtain a compact sintered body.

$B_2O_3$ is a glass forming component similar to $SiO_2$. It makes glass melting easy, suppresses excessive increase in thermal expansion coefficient of glass, gives glass a suitable flow property upon baking, and adjusts refractive index of glass together with $SiO_2$. It is preferably contained in 50-58% in glass. If it is less than 50%, flow property of glass becomes insufficient, and sintering property is damaged. On the other hand, if it exceeds 58%, softening point of glass becomes too high, and sintering property is damaged.

$Al_2O_3$ gives glass a suitable flow property and has an action to increase chemical resistance of glass. It is contained in 10-20%. If it is less than 10%, flow property of glass becomes large, and a sufficient chemical resistance cannot be obtained. If it exceeds 20%, flow property of glass becomes inferior, and sintering property is damaged. More preferably, it is in a range of 12-19%.

ZnO lowers softening point of glass and adjusts thermal expansion coefficient in a suitable range. It can be contained in glass up to 6%. If it exceeds 6%, it reacts with a photosensitive component in paste. With this, viscosity of paste increases in a short period of time.

MgO, CaO, SrO and BaO give glass flow property suitably and have an effect of increasing chemical resistance of glass. At least one selected from these is contained by 10-22%. If it is less than 10%, flow property of glass becomes insufficient, and a baking at 560° C. or lower becomes difficult. On the other hand, if it exceeds 22%, thermal expansion coefficient of glass becomes too high.

$Li_2O$ lowers softening point of glass, gives flow property suitably, and adjusts thermal expansion coefficient in a suitable range. It can be contained up to 2.8%. If it exceeds 2.8%, thermal expansion coefficient is increased excessively. Furthermore, the amount of elution of alkali ions in glass becomes large, and viscosity of paste increases.

It is desirable to make the glass fine grains (A) have a thermal expansion coefficient in 30° C.-300° C. in a range of $50 \times 10^{-7}$/° C. to $70 \times 10^{-7}$/° C. If it is less than $50 \times 10^{-7}$/° C., thermal expansion coefficient becomes low when they are mixed with the glass fine grains (B). With this, it is not possible to obtain compatibility with soda-lime glass substrate (thermal expansion coefficient $80 \times 10^{-7}$/° C.). On the other hand, if it exceeds $70 \times 10^{-7}$/° C., thermal expansion coefficient becomes too high when they are mixed with the glass fine grains (B). With this, it is not possible to obtain compatibility with soda-lime glass substrate. Furthermore, softening point is made to be not lower than 570° C. and not higher than 640° C. If it is less than 570° C., flow property becomes large. With this, the sintered body tends to soften and flow. On the other hand, if it exceeds 640° C., flow property lowers, and it becomes difficult to obtain a compact sintered body.

The glass fine grains (B) may be of a lead-free, bismuth-free, low-melting-point glass characterized in that it contains 0-9 wt % of $SiO_2$, 50-55 wt % of $B_2O_3$, 0-11 wt % of $Al_2O_3$, 0-12 wt % of ZnO, 21-25 wt % of $R_2O$ ($Li_2O+Na_2O+K_2O$), 0-10 wt % of $P_2O_5$, 0-3 wt % of $ZrO_2$, and 5-17 wt % of at least one selected from MgO, CaO, SrO and BaO and that refractive index is 1.53-1.56. In the following, each constituent component of this glass is described in detail.

$SiO_2$ is a glass forming component. By making it coexist with $B_2O_3$, which is another glass forming component, it is possible to form a stable glass. It can be contained up to 9% (wt %, it is the same in the following, too). If it exceeds 9%, flow property of glass lowers, and it becomes difficult to obtain a compact sintered body.

$B_2O_3$ is a glass forming component similar to $SiO_2$. It makes glass melting easy, suppresses excessive increase in thermal expansion coefficient of glass, gives glass a suitable flow property upon baking, and adjusts refractive index of glass together with $SiO_2$. It is preferably contained in 50-55% in glass. If it is less than 50%, flow property of glass becomes insufficient, and sintering property is damaged. On the other hand, if it exceeds 55%, softening point of glass becomes too high, and sintering property is damaged. More preferably, it is in a range of 50-53%.

$Al_2O_3$ gives glass a suitable flow property and has an action to increase chemical resistance of glass. It is contained in 0-11%. If it exceeds 11%, flow property of glass becomes inferior, and sintering property is damaged. More preferably, it is in a range of 1-11%.

ZnO lowers softening point of glass and adjusts thermal expansion coefficient in a suitable range. It can be contained in glass up to 12%. If it exceeds 12%, it reacts with a photosensitive component in paste. With this, viscosity of paste increases in a short period of time. More preferably, it is in a range of 0-6%.

MgO, CaO, SrO and BaO give glass flow property suitably and have an effect of increasing chemical resistance of glass. At least one selected from these is contained by 5-17%. If it is less than 5%, chemical resistance of glass becomes insufficient. With this, the amount of elution of alkali ions in glass becomes large, and viscosity of paste increases. On the other hand, if it exceeds 17%, thermal expansion coefficient of glass becomes too high.

$R_2O$ ($Li_2O+Na_2O+K_2O$) lowers softening point of glass, gives flow property suitably, and adjusts thermal expansion coefficient in a suitable range. It is preferably contained in a range of 21-25%. If it is less than 21%, it is not possible to achieve the above action. If it exceeds 25%, thermal expansion coefficient is increased excessively. Furthermore, the amount of elution of alkali ions in glass becomes large, and viscosity of paste increases. It is possible to suppress the amount of elution of alkali ions in glass by adjusting the weight ratio of $Li_2O/K_2O$ to not lower than 0.2 and not higher than 0.5 and by adjusting the weight ratio of $Na_2O/K_2O$ to not lower than 0.6 and not higher than 1.5. If it strays from this range, the amount of elution of alkali ions in glass becomes large, and viscosity of paste increases.

$P_2O_5$ is a glass forming component. By making it coexist with $SiO_2$, which is another glass forming component, it is possible to form a stable glass and to increase chemical resistance. It is contained by 0-10%. If it exceeds 10%, softening point becomes high, flow property becomes insufficient, and sintering property is damaged. Furthermore, it is preferable in the amount of coexistence with $SiO_2$ that $SiO_2+P_2O_5$ is 2-10%. If it is less than 2%, the formation of glass becomes unstable. On the other hand, if it exceeds 10%, flow property of glass lowers, and it becomes difficult to obtain a compact sintered body.

$ZrO_2$ has an effect of increasing chemical resistance of glass and is contained in a range of 0-3%. More preferably, it is a range of 0.1% to 3%.

It is desirable to make the glass fine grains (B) have a thermal expansion coefficient in 30° C.-300° C. in a range of $95 \times 10^{-7}/°$ C. to $115 \times 10^{-7}/°$ C. If it is less than $95 \times 10^{-7}/°$ C., thermal expansion coefficient becomes low when they are mixed with the glass fine grains (A). With this, it is not possible to obtain compatibility with soda-lime glass substrate (thermal expansion coefficient $80 \times 10^{-7}/°$ C.). On the other hand, if it exceeds $115 \times 10^{-7}/°$ C., thermal expansion coefficient becomes too high when they are mixed with the glass fine grains (A). With this, it is not possible to obtain compatibility with soda-lime glass substrate.

Furthermore, softening point of the glass fine grains (B) is made to be not lower than 480° C. and not higher than 540° C. If it is less than 480° C., flow property becomes large. With this, the sintered body tends to soften and flow. On the other hand, if it exceeds 540° C., flow property lowers, and it becomes difficult to obtain a compact sintered body.

Furthermore, refractive indexes of the glass fine grains (A) and the glass fine grains (B) are made to be in a range of 1.53-1.56. Since it is possible to match refractive index of the glass fine grains, which are superior in light transmission, with that of the photosensitive organic component, it becomes possible to achieve patterning with high aspect ratio and high precision.

It is desirable that the lowest baking temperature [T1], at which a compact sintered body can be obtained, is in a range of 500-560° C. If it is less than 500° C., carbon derived from the organic component tends to remain in the glass ceramics. On the other hand, if it exceeds 560° C., it cannot be formed within the heat resistant temperature of soda-lime glass substrate. Furthermore, between that and the temperature [T2], at which a sintered body starts to soften and flow, it is desirable that there is a relation of T2−T1≧40. If [T2−T1] is less than 40° C., excess or deficiency of baking tends to occur by the change of the baking temperature.

Still furthermore, according to the present invention, there is provided a PDP panel (back surface substrate) using the above glass ceramic material for photosensitive paste. By using the above glass ceramic material for photosensitive paste, it is possible to make a PDP panel (back surface substrate that a partition wall layer patterning with high precision is possible.

EXAMPLE 1

In the following, the present invention is explained by examples. The present invention is, however, not limited to the examples.

(Preparation of low-melting-point glass fine grains) To prepare the glass fine grains (A), there were used fine powder silica sand as $SiO_2$ source, boric acid as $B_2O_3$ source, alumina as $Al_2O_3$ source, zinc oxide as ZnO source, magnesium oxide as MgO source, calcium carbonate as CaO source, strontium carbonate as SrO source, barium carbonate as BaO source, and lithium carbonate as $Li_2O$ source. These were mixed together to have a desired low-melting-point glass composition, followed by introduction into a platinum crucible and heating melting at 1200-1300° C. for 1-2 hours in an electric furnace, thereby obtaining glasses of compositions shown in Examples A1-A8 in Table 1 and Comparative Examples C1-C4 in Table 3. Glasses of compositions shown in C1-C4 are glasses that do not conform to the glass fine grains (A) of the present invention.

To prepare the glass fine grains (B), there were used fine powder silica sand as $SiO_2$ source, boric acid as $B_2O_3$ source, alumina as $Al_2O_3$ source, zinc oxide as ZnO source, magnesium oxide as MgO source, calcium carbonate as CaO source, strontium carbonate as SrO source, barium carbonate as BaO source, lithium carbonate as $Li_2O$ source, sodium carbonate as $Na_2O$ source, potassium carbonate as $K_2O$ source, boron phosphate as $P_2O_5$ source, and zircon as $ZrO_2$ source. These were mixed together to have a desired low-melting-point glass composition, followed by introduction into a platinum crucible and heating melting at 1100-1200° C. for 1-2 hours in an electric furnace, thereby obtaining glasses of compositions shown in Examples B1-B8 in Table 2 and Comparative Examples D1-D4 in Table 3. Glasses of compositions shown in D1-D4 are glasses that do not conform to the glass fine grains (B) of the present invention.

TABLE 1

|  | A1 | A2 | A3 | A4 | A5 | A6 | A7 | A8 |
|---|---|---|---|---|---|---|---|---|
| $SiO_2$ | 7.7 | 10.3 | 8.3 | 8.2 | 8.0 | 7.9 | 8.1 | 2.6 |
| $B_2O_3$ | 52.3 | 53.5 | 56.5 | 55.9 | 54.1 | 53.6 | 54.9 | 54.3 |
| $Al_2O_3$ | 13.1 | 13.4 | 19.1 | 18.9 | 18.3 | 18.1 | 18.5 | 19.8 |
| ZnO | 5.2 |  |  |  |  | 2.7 | 5.5 |  |
| MgO |  |  | 2.8 |  |  |  |  |  |
| CaO |  |  |  | 3.8 |  |  |  |  |
| SrO |  |  |  |  | 6.9 |  |  |  |
| BaO | 19.7 | 20.1 | 10.6 | 10.5 | 10.2 | 15.1 | 10.3 | 21.1 |
| $Li_2O$ | 1.9 | 2.7 | 2.7 | 2.7 | 2.6 | 2.6 | 2.6 | 2.2 |
| Thermal Expansion Coefficient ($\times 10^{-7}$) [30-300° C.] | 58 | 62 | 55 | 57 | 58 | 54 | 54 | 61 |
| Glass Softening Point (° C.) | 598 | 595 | 611 | 605 | 607 | 593 | 599 | 620 |

TABLE 2

|  | B1 | B2 | B3 | B4 | B5 | B6 | B7 | B8 |
|---|---|---|---|---|---|---|---|---|
| $SiO_2$ | 4.0 | 4.1 | 4.1 | 1.6 |  | 2.4 | 8.6 | 4.2 |
| $B_2O_3$ | 51.0 | 52.2 | 51.5 | 50.3 | 50.4 | 50.3 | 53.1 | 51.8 |
| $Al_2O_3$ | 7.0 | 10.4 | 7.0 | 6.9 | 6.7 |  |  |  |
| ZnO |  | 5.5 |  |  |  | 11.0 |  | 11.3 |
| MgO |  |  | 2.7 |  |  |  |  |  |
| CaO | 2.0 |  |  | 3.8 | 3.7 |  | 4.0 |  |
| SrO | 3.5 |  |  |  |  |  |  |  |
| BaO | 10.0 | 4.5 | 10.5 | 10.3 | 8.5 | 10.4 | 10.9 | 10.7 |
| $Li_2O$ | 2.5 | 2.7 | 2.6 | 2.7 | 2.8 | 2.8 | 2.9 | 2.9 |
| $Na_2O$ | 8.0 | 8.3 | 8.0 | 8.4 | 8.5 | 8.4 | 8.8 | 10.5 |
| $K_2O$ | 10.9 | 10.3 | 10.5 | 10.2 | 10.0 | 12.7 | 10.7 | 7.5 |
| $P_2O_5$ |  |  |  | 5.8 | 9.4 |  |  |  |
| $ZrO_2$ | 1.0 | 2.0 | 3.0 |  |  | 2.0 | 1.0 | 1.0 |
| Thermal Expansion Coefficient ($\times 10^{-7}$) [30-300° C.] | 108 | 105 | 99 | 110 | 109 | 114 | 106 | 109 |

TABLE 2-continued

|  | B1 | B2 | B3 | B4 | B5 | B6 | B7 | B8 |
|---|---|---|---|---|---|---|---|---|
| Glass Softening Point (° C.) | 502 | 512 | 514 | 518 | 527 | 482 | 511 | 494 |

TABLE 3

|  | C1 | C2 | C3 | C4 | D1 | D2 | D3 | D4 |
|---|---|---|---|---|---|---|---|---|
| $SiO_2$ | 2.7 | 9.4 | 13.7 | 38.5 | 3.0 | 47.7 | 8.7 | 3.2 |
| $B_2O_3$ | 48.9 | 42.3 | 17.6 | 8.7 | 39.0 | 19.9 | 44.5 | 41.2 |
| $Al_2O_3$ |  | 1.0 | 4.2 | 35.5 |  | 8.1 | 5.6 |  |
| ZnO | 20.8 | 25.2 | 22.2 | 5.1 | 33.4 | 6.1 | 16.1 | 35.2 |
| MgO |  |  |  |  |  |  |  |  |
| CaO |  |  |  | 4.1 |  |  |  |  |
| SrO |  |  |  |  |  |  |  |  |
| BaO | 19.6 |  | 14.8 | 5.1 | 9.7 | 5.1 | 12.1 | 10.2 |
| $Li_2O$ |  | 4.8 |  | 3.0 |  | 2.0 | 11.0 |  |
| $Na_2O$ | 7.9 |  |  |  |  |  |  | 7.3 |
| $K_2O$ |  | 1.6 |  |  | 14.9 | 11.2 | 2.0 | 2.9 |
| $Bi_2O_3$ |  |  | 27.5 |  |  |  |  |  |
| Thermal Expansion Coefficient ($\times 10^{-7}$) [30-300° C.] | 80 | 72 | 75 | 43 | 87 | 80 | 93 | 79 |
| Glass Softening Point (° C.) | 570 | 557 | 548 | 800 | 470 | 520 | 508 | 543 |

A part of the glass was poured into a mold to make it block-like and used for measuring the properties (thermal expansion coefficient, softening point, and refractive index). The remaining glass was formed into flakes with a rapid-cooling, dual roll former, and they were subjected to sizing with a grinder into a powder having an average grain size of 2-3 μm and a maximum grain size of less than 10 μm.

(Preparation of glass ceramic material for photosensitive paste) The glass fine grains (A) and the glass fine grains (B) were mixed together to make a desired glass ceramic material for photosensitive paste, thereby obtaining glass ceramic materials for photosensitive paste shown in Examples R1-R8 in Table 4 and Comparative Examples S1-S4 in Table 5.

TABLE 4

|  |  | R1 | R2 | R3 | R4 | R5 | R6 | R7 | R8 |
|---|---|---|---|---|---|---|---|---|---|
| Glass Fine Grains (A) | No. | A2 | A6 | A8 | A7 | A1 | A3 | A4 | A5 |
| Mixing Ratio | wt % | 65 | 55 | 60 | 40 | 55 | 50 | 55 | 55 |
| Glass Fine Grains (B) | No. | B6 | B4 | B8 | B3 | B5 | B2 | B1 | B7 |
| Mixing Ratio | wt % | 35 | 45 | 40 | 60 | 45 | 50 | 45 | 45 |
| Sintered Body's Thermal Expansion Coefficient ($\times 10^{-7}$) [30-300° C.] |  | 80 | 79 | 80 | 81 | 81 | 80 | 80 | 79 |
| Lowest Baking Temperature [T1] |  | 500 | 530 | 510 | 520 | 560 | 520 | 520 | 550 |
| Optimum Baking Temp. Range |  | ○ | ○ | ○ | ○ | ○ | ○ | ○ | ○ |
| Paste Viscosity Increase |  | ○ | ◉ | ○ | ◉ | ◉ | ◉ | ◉ | ◉ |

TABLE 5

|  |  | S1 | S2 | S3 | S4 |
|---|---|---|---|---|---|
| Glass Fine Grains (A) | No. | C1 | C2 | C3 | C4 |
| Mixing Ratio | wt % | 45 | 65 | 55 | 60 |
| Glass Fine Grains (B) | No. | D1 | D2 | D4 | D3 |
| Mixing Ratio | wt % | 55 | 35 | 45 | 40 |
| Sintered Body's Thermal Expansion Coefficient ($\times 10^{-7}$) [30-300° C.] |  | 82 | 75 | 78 | 68 |
| Lowest Baking Temperature [T1] |  | 580 | 550 | 510 | 600 |
| Optimum Baking Temp. Range |  | X | X | X | ○ |
| Paste Viscosity Increase |  | X | ◉ | X | X |

(Formation of glass ceramics) To determine the after-mentioned T1 and T2, a plurality of samples were prepared for each of Examples R1-R8 and Comparative Examples S1-S4, and they were baked at different temperatures. Specifically, a plurality of samples were prepared by subjecting a part of the above glass ceramic material for photosensitive paste to a pressurized forming to have a diameter of 12 mmφ and a thickness of 5 mm, and glass ceramics were obtained by conducting baking for 40 minutes at different temperatures at 10° C. intervals in a range of 480-640° C.

The obtained glass ceramic was crushed, and the fracture was immersed in a permeable dye. Then, the fracture was observed with naked eyes and a microscope. In case that the dye did not permeate, it was judged that a compact sintered body had been obtained. It was decided as the lowest baking temperature T1 for obtaining a compact sintered body.

Furthermore, the obtained glass ceramic was observed with naked eyes. In case that an edge portion of the glass ceramic was rounded through softening and flowing, it was judged that the sintered body had started to soften and flow. It was decided as the temperature T2 at which the sintered body started to soften and flow.

Furthermore, the optimum baking temperature range was defined between T1 and T2. In case that [T2−T1] was 40° C. or greater, it was judged as ○. In the case of less than 40° C., it was judged as x.

(Preparation of photosensitive paste) The remaining glass ceramic material for photosensitive paste was dispersed in an organic component containing a photosensitive compound, thereby obtaining a photosensitive paste.

On the obtained photosensitive paste, there were measured a paste viscosity [V1] immediately after the dispersion and a paste viscosity [V2] after allowing it to stand still for 24 hours in a 5° C. low-temperature room. In case that [V2/V1] was less than 1.2, it was judged as ◉ that there was no reaction with the photosensitive component. In case that it was in a range of 1.2-1.5, it was judged as ○ that there was a reaction with the photosensitive component, but no practical problem. In case that it exceeded 1.5, it was judged as x that there was a reaction with the photosensitive component.

(Results) The glass ceramic materials for photosensitive paste and all of the test results are shown in Table 4 and Table 5. The glass compositions of the glass fine grains (A) used in Examples R1-R8 of the glass ceramic materials for photosensitive paste are shown in A1-A8 in Table 1. The glass compositions of the glass fine grains (B) used in Examples R1-R8 of the glass ceramic materials for photosensitive paste are shown in B1-B8 in Table 2. The low-melting-point glass compositions used in Comparative Examples S1-S4 are shown in C1-C4 and D1-D4 in Table 3.

As shown in Examples R1-R8 in Table 4, within the compositional range of the present invention, the lowest baking temperatures for obtaining compact sintered bodies are in a range of 500-560° C., and the optimum baking temperature ranges are wide as being 40° C. or greater. Furthermore, the paste viscosity increase caused by the reaction with the photosensitive composition is suppressed. Thus, it can preferably be used as a glass ceramic material for a photosensitive paste used for forming a partition wall layer of plasma display panel, plasma address liquid-crystal display panel, etc. and for forming a high precision pattern in the insulating film formation of other electric and electronic circuits.

On the other hand, in Comparative Examples S1 and S4 in Table 5, which are out of the compositional range of the present invention, the lowest baking temperatures stray from the range of 500-560° C. In the case of Comparative Examples S2 and S3, they are in the range of 500-560° C., but the optimum baking temperature ranges are narrow as being less than 40° C. Furthermore, in the case of S3, the paste viscosity increase caused by the reaction with the photosensitive component is recognized. Therefore, in the case of Comparative Examples S1-S4, it is not possible to use them as glass ceramic materials for photosensitive paste, which are used in high precision patterning.

The invention claimed is:

1. A glass ceramic material for plasma display, comprising:
   40-70 wt % of glass fine grains (A) having a softening point of 570-640° C., and
   30-60 wt % of glass fine grains (B) having a softening point of 480-540° C.
   wherein the glass fine grains (A) comprise 2-12 wt % of $SiO_2$, 50-58 wt % of $B_2O_3$, 10-20 wt % of $Al_2O_3$, 0-6 wt % of ZnO, 0-2.8 wt % of $Li_2O$, and 10-22 wt % of at least one selected from MgO, CaO, SrO and BaO, and wherein refractive index of the glass fine grains (A) is 1.53-1.56.

2. A glass ceramic material for plasma display according to claim 1, wherein thermal expansion coefficient of the glass fine grains (A) in 30° C.-300° C. is $50\times10^{-7}/°$ C. to $70\times10^{-7}/°$ C.

3. A glass ceramic material for plasma display according to claim 1, wherein the glass fine grains (B) comprise 0-9 wt % of $SiO_2$, 50-55 wt % of $B_2O_3$, 0-11 wt % of $Al_2O_3$, 0-12 wt % of ZnO, 21-25 wt % of $R_2O$ ($Li_2O+Na_2O+K_2O$), 0-10 wt % of $P_2O_5$, 0-3 wt % of $ZrO_2$, and 5-17 wt % of at least one selected from MgO, CaO, SrO and BaO, and wherein refractive index of the glass fine grains (B) is 1.53-1.56.

4. A glass ceramic material for plasma display according to claim 1, wherein thermal expansion coefficient of the glass fine grains (B) in 30° C.-300° C. is $95\times10^{-7}/°$ C. to $115\times10^{-7}/°$ C.

5. A glass ceramic material for plasma display according to claim 1, wherein a lowest baking temperature [T1], at which a compact sintered body of the glass ceramic material can be obtained, is 500-560° C., and [T1] and a temperature [T2], at which a sintered body of the glass ceramic material starts to soften and flow satisfy a formula of T2−T1≧40.

6. A back surface substrate for plasma display panel, comprising a glass ceramic material for plasma display according to claim 1.

* * * * *